(12) United States Patent
Hornig

(10) Patent No.: US 8,048,964 B2
(45) Date of Patent: Nov. 1, 2011

(54) CROSSLINKING AGENT

(75) Inventor: Roy Horst Josef Hornig, Bad Urach (DE)

(73) Assignee: ElringKlinger AG, Dettingen (DE)

( * ) Notice: Subject to any disclaimer, the term of this patent is extended or adjusted under 35 U.S.C. 154(b) by 191 days.

(21) Appl. No.: 12/386,145

(22) Filed: Apr. 14, 2009

(65) Prior Publication Data
US 2009/0270549 A1    Oct. 29, 2009

(30) Foreign Application Priority Data
Apr. 15, 2008   (DE) .................... 10 2008 020 196

(51) Int. Cl.
*C08C 19/22* (2006.01)
*C08J 3/24* (2006.01)
*C08K 5/3465* (2006.01)

(52) U.S. Cl. ............... 525/330.5; 525/375; 525/379; 252/182.13; 252/182.23

(58) Field of Classification Search ........... 525/330.5, 525/375, 379; 252/182.13, 182.23
See application file for complete search history.

(56) References Cited

U.S. PATENT DOCUMENTS

| 2006/0012077 | A1 | 1/2006 | Salameh et al. | ............ 264/328.1 |
| 2010/0222510 | A1* | 9/2010 | Kelbch et al. | .................... 525/72 |

FOREIGN PATENT DOCUMENTS

EP   1 617 112 A1   1/2006

OTHER PUBLICATIONS

"Replacement of DOTG in Zeon HT-ACM Elastomers—Further Studies—" by ZEON European Technical Service, Mar. 2008.
Technical Data Sheet "An alternate accelerator for DuPont™ Vamac® terpolymers: Vulcofac® ACT 55" by DuPont, pp. 1-4, 2007.

* cited by examiner

*Primary Examiner* — Roberto Rabago

(57) ABSTRACT

In order to make available a crosslinking agent for ethylene acrylate (AEM) and polyacrylate (ACM) elastomers, which is equivalent to the crosslinking agents containing guanidine that have been used until now, but which does without the teratogenically acting guanidines which are toxicologically hazardous, it is proposed that the crosslinking agent for diaminically crosslinkable AEM and ACM elastomers comprise a diamine crosslinker, an accelerator selected from 1,8-diazabicyclo-5,4,0-undec-7-ene (DBU), derivatives and salts thereof, and a moderator of the pyrrolidone type.

13 Claims, No Drawings

CROSSLINKING AGENT

CROSSLINKING AGENT

The present disclosure relates to the subject matter disclosed in German application number 10 2008 020 196.0 of Apr. 15, 2008, which is incorporated herein by reference in its entirety and for all purposes.

BACKGROUND OF THE INVENTION

The invention relates to a crosslinking agent for diaminically crosslinkable ethylene acrylate and polyacrylate elastomers. Ethylene acrylate elastomers are referred to hereinbelow as AEM elastomers and polyacrylate elastomers as ACM elastomers.

AEM and ACM elastomers are relatively inexpensive elastomeric materials which are usable in a large number of applications, in particular, also in the area of seals. The two elastomers may also be used in mixtures with one another as an elastomeric material.

Those AEM and ACM elastomers which are accessible to diaminic crosslinking comprise so-called cure site monomer units whose content in the elastomer is normally approximately 1 to approximately 5 phr.

The possibilities for use of these elastomeric materials in the area of seals range from static seals such as, for example, cylinder head, valve cover or oil sump gaskets, seals for manual transmissions and automatic transmissions, O-rings, seals in the area of intake manifolds and exhaust gas recirculations to dynamically stressed sealing elements such as, for example, piston sealing rings, in particular, also so-called bonded piston seals.

AEM elastomers are obtainable, for example, from DuPont under the trade name VAMAC®. ACM elastomers are sold by Zeon Chemicals, for example, under the trade names Nipol® and HyTemp®.

In addition, Tohpe Corporation, Unimatec and Nippon Mectron offer diaminically crosslinkable elastomers of the ACM type.

Conventionally, diaminically crosslinkable AEM and ACM elastomers are crosslinked with crosslinking agents such as, for example, hexamethylene diamine carbamate, N,N-dicinnamylide diamine carbamate, 4,4-diaminodicyclohexylmethane, m-xylene diamine, 4,4-diaminodiphenylmethane, 4,4-diaminodiphenyl ether and 2,2-bis[4-(4-aminophenoxy)phenyl]propane, which can be used individually or in mixtures. Other suitable diamine crosslinking agents belong to the group of hexamethylene diamines.

The aforementioned crosslinking systems are used together with an accelerator, which is preferably taken from substances of the guanidine group, to which, in particular, the accelerators OTBG, DOTG, DPG and/or biguanidine belong.

For some time, these accelerators have been classified as toxicologically hazardous. They also act teratogenically upon contact with the skin.

In view of the European Union REACH Regulation, availability of such accelerators in the future appears questionable.

Tertiary amines such as, for example, 1,8-diazabicyclo-5,4,0-undec-7-ene (DBU), have been suggested as alternatives to these accelerators, but they do not constitute an equivalent alternative to the guanidine accelerators since they result in inferior elastic properties of the crosslinked elastomer, with the same crosslinker component content, and, in particular, the compression set at elevated temperatures suffers considerably.

Furthermore, the storage stability of these accelerators in comparison with the guanidine accelerators in the finished mixture of the elastomer with the crosslinking system is significantly reduced.

The object of the invention is to propose a crosslinking agent for AEM and ACM elastomers, which is equivalent to the crosslinking agents containing guanidine that have been used until now, but which does without the teratogenically acting guanidines which are toxicologically hazardous.

SUMMARY OF THE INVENTION

This object is accomplished in accordance with the invention by a crosslinking agent for diaminically crosslinkable ethylene acrylate (AEM) and polyacrylate (ACM) elastomers, comprising a diamine crosslinker, an accelerator selected from 1,8-diazabicyclo-5,4,0-undec-7-ene (DBU), derivatives and salts thereof, and a moderator of the pyrrolidone type.

Surprisingly, it has been found that the diamine crosslinkers can be successfully used with DBU accelerators when the reaction speed of the DBU accelerators is reduced by a substance with a moderating effect. In particular, pyrrolidones have proven to be of value as moderator with a retarding effect. By using pyrrolidones as moderator, it is possible to lower the reaction speed of the DBU accelerators to such an extent that an inhomogeneous crosslinking structure can be avoided, while at the same time still maintaining a sufficiently high reaction speed for the crosslinking reaction.

Furthermore, an extended storage stability of the crosslinking agents comparable to the previously obtained storage stabilities of the crosslinking agents containing guanidine is achieved by adding pyrrolidones.

Typical representatives of DBU accelerators, which may be used in conjunction with the present invention, are Vulcofac® ACT 55 of the company Safic Alcan, Rhenogran® XLA 60 of the company Rhein Chemie, Alcanpoudre® DBU 70 of the company Safic Alcan and LUVOMAXX Safe Cure® CA of the company Lehmann & Voss & Co.

DETAILED DESCRIPTION OF THE INVENTION

It is recommended that pyrrolidones be added to the crosslinking agent, in particular, in a weight ratio of DBU to pyrrolidone of approximately 1:1 to approximately 7:1, preferably approximately 1.5:1 to approximately 5:1. These ranges apply for the particularly preferred 2-pyrrolidone as moderator.

Also possible are N-methylpyrrolidone or polyvinylpyrrolidone (PVP) with a higher dosage.

The representatives mentioned at the outset, i.e., in particular, hexamethylene diamine carbamate, N,N-dicinnamylide diamine carbamate, 4,4-diaminodicyclohexylmethane, m-xylene diamine, 4,4-diaminodiphenylmethane, 4,4-diaminodiphenyl ether, 2,2-bis[4-(4-amino-phenoxy)phenyl]propane and hexamethylene diamines, are preferably used as diamine crosslinker.

Typically, the accelerator is used in a weight ratio to the diamine crosslinker of approximately 1:1 to approximately 3:1. In particular, the weight ratio ranging from approximately 1.5:1 to approximately 2.5:1 is used.

The invention also relates to the use of a crosslinking agent in accordance with the present invention for crosslinking diaminically crosslinkable AEM elastomers.

Herein the crosslinking agent is preferably used in a proportion of approximately 0.8 phr to approximately 3 phr, in particular, approximately 1 phr to approximately 2.5 phr (phr is parts per hundred of rubber).

Typical, preferred accelerator contents range from approximately 1.5. to 6 phr.

The invention also relates to the use of the crosslinking agent according to the invention for crosslinking diaminically crosslinkable ACM elastomers. ACM elastomers can be crosslinked under comparable conditions. This applies, in particular, to the crosslinking agent contents.

Furthermore, ACM and AEM elastomers may be optionally used in mixtures with one another, and proportions of crosslinking agent in the elastomer mixture deducible from the above-mentioned ranges are then recommended.

The invention also relates to diaminically crosslinked AEM elastomer and/or ACM elastomer, produced using a crosslinking agent according to the invention.

In addition, the diaminically crosslinked elastomers according to the invention may contain conventional processing agents, synthetic plasticizers, fillers etc.

Finally, the invention relates to a seal, comprising an elastomeric sealing element, the elastomeric sealing element being produced from an elastomer according to the invention or an elastomer mixture according to the invention.

The seals according to the invention may consist substantially completely of the elastomeric sealing element, i.e., may be produced completely from the elastomeric material according to the invention, for example, in the form of a flat material with a thickness of from one to several millimeters, which as such is easy to handle.

In other applications, the seal according to the invention comprises a substrate, in particular, a plastic substrate, an inorganic substrate or a substrate in the form of a metallic support, for example, a metal sheet.

The substrate in the seals according to the invention is embedded, in accordance with one of the embodiments at least in areas thereof, and in accordance with another embodiment completely, in the elastomeric sealing element.

Here the substrate assumes a reinforcing function for the elastomeric sealing element. In these cases, the layer thickness of the elastomeric materials can be minimized. Typical layer thicknesses lie in a wide range of approximately 5 μm to approximately 10 mm or more.

In the applications in which the substrate is substantially completely embedded in the elastomeric material, the substrate is practically not freely accessible at any point on the surface. The substrate is, therefore, completely enclosed by the elastomeric material and, for example, protected against aggressive chemicals.

When substrates are used in the seals according to the invention, in order to obtain better adhesion to the substrate, in particular, when a metallic support is used as substrate, an adhesive is applied to the substrate surface before the coating with the elastomeric material is carried out.

Various methods are suitable for producing the elastomeric sealing elements in the seals according to the invention. In particular, the elastomeric materials can be formed by injection molding methods, the transfer molding method or also a compression molding method.

Other suitable forming methods are extrusion and calendering, which may also be used for producing the seals or elastomeric sealing elements according to the invention.

These and further advantages of the invention will be explained in greater detail hereinbelow with reference to the Examples.

Examples 1 to 9

The VAMAC GLS type is used as AEM elastomer. All of the values contained in the following Table 1 are parts by weight and relate to 100 parts by weight of this elastomer.

TABLE 1

| | Example 1 | Example 2 | Example 3 | Example 4 | Example 5 | Example 6 | Example 7 | Example 8 | Example 9 |
|---|---|---|---|---|---|---|---|---|---|
| Component | | | | | | | | | |
| Filler (carbon black) | 75 | 75 | 75 | 75 | 75 | 75 | 75 | 75 | 75 |
| Processing agent | 2 | 2 | 2 | 2 | 2 | 2 | 2 | 2 | 2 |
| Flow agent | 0.5 | 0.5 | 0.5 | 0.5 | 0.5 | 0.5 | 0.5 | 0.5 | 0.5 |
| Release agent | 1 | 1 | 1 | 1 | 1 | 1 | 1 | 1 | 1 |
| Age-protecting agent | 2 | 2 | 2 | 2 | 2 | 2 | 2 | 2 | 2 |
| Plasticizer 1 | 17 | | 17 | | 17 | | 17 | 17 | 17 |
| Plasticizer 2 | | 17 | | 17 | | 17 | | | |
| Crosslinker 1 | 1.2 | 1.2 | 1.2 | 1.2 | 1.2 | 1.2 | 1.2 | 1.2 | |
| Crosslinker 2 | | | | | | | | | 1.87 |
| Accelerator | 1.50 | 1.50 | 2.50 | 2.50 | 3.50 | 3.50 | 4.50 | 4.50 | 4.50 |
| Moderator | 0.8 | 0.8 | 0.8 | 0.8 | 1 | 1 | 1 | 1.2 | 0.8 |
| Properties | | | | | | | | | |
| Hardness [Shore A] | 62.3 | 62.3 | 61.3 | 65.0 | 61.1 | 64.2 | | 62.5 | 66.5 |
| Compression set [%] | 49.1 | 55.2 | 43.2 | 53.3 | 38.8 | 44.0 | 33.8 | 41.0 | 31.8 |

The hardness values contained in Table 1 are Shore A values measured in accordance with DIN EN ISO 868.

The values of the compression set, so-called compression set values, result from a compression of the sample by 25% at 150° C. and a holding time of 24 hours at this temperature. The samples were taken out of the testing apparatus in the cold state (RT). The compression set values were determined after a relaxation time of 30 min (ISO 815-1-2).

The following specific products were used for the components given in Table 1:

| | |
|---|---|
| Filler (carbon black) | Corax N772 |
| Processing agent | Stearic acid |
| Flow agent | Armeen 18 D |
| Release agent | Vanfre VAM |
| Age-protecting agent | Dusantox 86 |
| Plasticizer 1 | Santicizer 409A |
| Plasticizer 2 | Bisoflex T810T |
| Crosslinker 1 | Vulcofac HDC |
| Crosslinker 2 | RT Advancure HD |
| Accelerator | Vulcofac ACT55 (DBU) |
| Moderator | 2-pyrrolidone |

The following Table 2 gives further test results from samples of Examples 1 to 9, which were obtained from tensile tests (ISO 730) and compression stress relaxation tests.

In order to determine the compression stress relaxation values, the sample body is first compressed to 75% of its original thickness. The force required to do this is the so-called static preload. Owing to relaxation processes in the sample body, the force required for the compression to 75% of the original thickness decreases in the course of time. The force required at the end of the 30-minute holding time is stated in the last line of Table 2. The entire test was carried out at 23° C.

TABLE 3

| Component | | Parts by weight [phr] |
|---|---|---|
| Filler (carbon black) | Corax N772 | 54 |
| Processing agent | Stearic acid | 2.00 |
| Flow agent | Armeen 18 D | 0.75 |
| Release agent | Vanfre VAM | 1.00 |
| Age-protecting agent | Dusantox 86 | 2.00 |
| Plasticizer 1 | Santicizer 409A | |
| Plasticizer 2 | Bisoflex T810T | 17 |
| Crosslinker 1 | Vulcofac HDC | 2.00 |
| Accelerator (DBU) | Vulcofac ACT55 | 1.50 |
| Moderator | 2-pyrrolidone | 0.80 |

The tear strength of the elastomer was 11.2 MPa, the elongation at break was determined at 314%, and the hardness was determined in accordance with Shore A at 54.6.

The compression set of the elastomers is summarized for several holding times of the samples in Table 4. The measuring conditions corresponded to those of Examples 1 to 9.

TABLE 4

| Measured value/Holding time [h] | 24 | 72 | 168 | 336 |
|---|---|---|---|---|
| Compression set [%] | 31.1 | 41.0 | 49.1 | 55.4 |

Examples 11 to 13

The use of various accelerators and their effect on the mechanical properties of the elastomers obtained are shown

TABLE 2

| Measured value | Example 1 | Example 2 | Example 3 | Example 4 | Example 5 | Example 6 | Example 7 | Example 8 | Example 9 |
|---|---|---|---|---|---|---|---|---|---|
| Tear strength [MPa] | 11.1 | 14.3 | 12.6 | 12.6 | 13.5 | 13.8 | 13.6 | 14.5 | 8.4 |
| Elongation at break [%] | 262 | 274 | 257 | 242 | 272 | 258 | 252 | 284 | 175 |
| Tension modulus M 25% [MPa] | 1.10 | 1.20 | 1.10 | 1.20 | 1.10 | 1.20 | 1.30 | 1.20 | 1.20 |
| Tension modulus M 50% [MPa] | 1.71 | 1.95 | 1.84 | 2.07 | 1.81 | 2.04 | 2.07 | 1.85 | 2.03 |
| Tension modulus M 100% [MPa] | 3.30 | 4.00 | 3.80 | 4.40 | 3.90 | 4.50 | 4.50 | 3.70 | 4.50 |
| Tension modulus M 200% [MPa] | 8.05 | 10.04 | 9.43 | 10.88 | 9.71 | 10.90 | 10.71 | 9.79 | |
| Compression stress relaxation | | | | | | | | | |
| Static preload [N] | 240.3 | 268.1 | 259.8 | 257.5 | 210.8 | 240.3 | 204.5 | 171.1 | 221.7 |
| After 30 min relaxation [N] | 118.7 | 135.2 | 131.5 | 131.8 | 119.0 | 118.7 | 122.4 | 99.3 | 137 |

Example 10

An AEM elastomer of the VAMAC GLS type is used here as elastomer. The formulation components are given in the following Table 3.

with reference to Examples 11 to 13. The formulations of the Examples and some important mechanical properties are summarized in Table 5. The proportions of the components in the respective formulation are given in parts by weight per 100 parts by weight of VAMAC GLS elastomer.

TABLE 5

| Component | | Example 11 | Example 12 | Example 13 |
|---|---|---|---|---|
| Filler (carbon black) | Corax N772 | 56 | 56 | 56 |
| Processing agent | Stearic acid | 2 | 2 | 2 |
| Flow agent | Armeen 18 D | 0.5 | 0.5 | 0.5 |
| Release agent | Vanfre VAM | 1.5 | 1.5 | 1.5 |
| Age-protecting agent | Dusantox 86 | 2 | 2 | 2 |
| Plasticizer 1 | Santicizer 409A | 17 | 17 | 17 |
| Plasticizer 2 | Bisoflex T810T | | | |
| Crosslinker 1 | Vulcofac HDC | 1.2 | 1.2 | 1.3 |
| Crosslinker 2 | RT Advancure HD | | | |
| Accelerator 1 | DOTG | 8 | | |
| Accelerator 2 (DBU) | Vulcofac ACT 55 | | 5.1 | 4.5 |
| Moderator | 2-pyrrolidone | | | 1 |
| Properties | | | | |
| Compression set [%] | | 30.0 | 41.5 | 28.0 |
| Tear strength [MPa] | | 10.8 | 9.6 | 13.6 |
| Elongation at break [%] | | 420 | 290 | 360 |

The results show that the compression set parameters (Example 13) obtainable in accordance with the invention are comparable to those of conventional formulations (Example 11). This means that the accelerator type DOTG which is hazardous to health is successfully replaced without having to tolerate disadvantages for the important mechanical properties of the elastomers as is the case when DBU accelerator is used (Example 12). This finding can also be proven by long-term tests (cf. the values of Table 6).

TABLE 6

| | Example 11 | | Example 12 | | Example 13 | |
|---|---|---|---|---|---|---|
| Months | Maximum volume [mm$^3$] | Maximum flow speed [mm$^3$/s] | Maximum volume [mm$^3$] | Maximum flow speed [mm$^3$/s] | Maximum volume [mm$^3$] | Maximum flow speed [mm$^3$/s] |
| 0 | 2577 | 188.3 | 2413 | 151.2 | 2067 | 159.3 |
| 1 | 1952 | 125.2 | 1760 | 98.2 | 1805 | 106.0 |
| 2 | 1683 | 106.2 | 1442 | 76.1 | 1550 | 99.0 |
| 4 | 644 | 34.1 | 337 | 16.0 | 525 | 28.0 |
| 5 | 375 | 21 | 216 | 12 | | |

The flow behavior summarized in Table 6 was determined in a Rheovulkameter long-term study at 20 bar, 190° C. and a warming-up time of 5 seconds.

The invention claimed is:

1. Crosslinking agent for diaminically crosslinkable ethylene acrylate (AEM) and polyacrylate (ACM) elastomers, comprising a diamine crosslinker, an accelerator selected from 1,8-diazabicyclo-5,4,0-undec-7-ene (DBU), derivatives and salts thereof, and a moderator selected from pyrrolidones.

2. Crosslinking agent in accordance with claim 1, wherein the weight ratio of DBU accelerator and pyrrolidone moderator is approximately 1:1 to approximately 7:1, preferably approximately 1.5:1 to approximately 5:1.

3. Crosslinking agent in accordance with claim 1, wherein the pyrrolidone moderator comprises 2-pyrrolidone.

4. Crosslinking agent in accordance with claim 1, wherein the accelerator is contained in a weight ratio to the diamine crosslinker of approximately 1:1 to approximately 3:1.

5. Crosslinking agent in accordance with claim 1, wherein the diamine crosslinker is selected from hexamethylene diamine carbamate, N,N-dicinnamylide diamine carbamate, 4,4-diaminodicyclohexylmethane, m-xylene diamine, 4,4-diaminodiphenylmethane, 4,4-diaminodiphenyl ether, 2,2-bis[4-(4-amino-phenoxy)phenyl]propane and hexamethylene diamines.

6. Process for crosslinking AEM elastomers, comprising:
providing a diaminically crosslinkable AEM elastomer;
adding a crosslinking agent selected from agents according to claim 1; and
crosslinking the AEM elastomer.

7. Process in accordance with claim 6, including adding the crosslinking agent to the AEM elastomer in a proportion of approximately 0.8 phr to approximately 3 phr, in particular, approximately 1 phr to approximately 2.5 phr, to achieve said cross-linking.

8. Process for crosslinking ACM elastomers, comprising:
providing a diaminically crosslinkable ACM elastomer;
adding a crosslinking agent selected from agents according to claim 1; and
crosslinking the ACM elastomer.

9. Diaminically crosslinked elastomeric material, comprising an AEM elastomer and/or ACM elastomer, produced using a crosslinking agent in accordance with claim 1.

10. Seal comprising an elastomeric sealing element, said sealing element consisting of an elastomeric material in accordance with claim 9.

11. Seal in accordance with claim 10, comprising a substrate on which the elastomeric sealing element is arranged.

12. Seal in accordance with claim 10, comprising a substrate which is partially or completely enclosed by the elastomeric sealing element.

13. Seal in accordance with claim 10, consisting of the elastomeric sealing element.

* * * * *